United States Patent Office

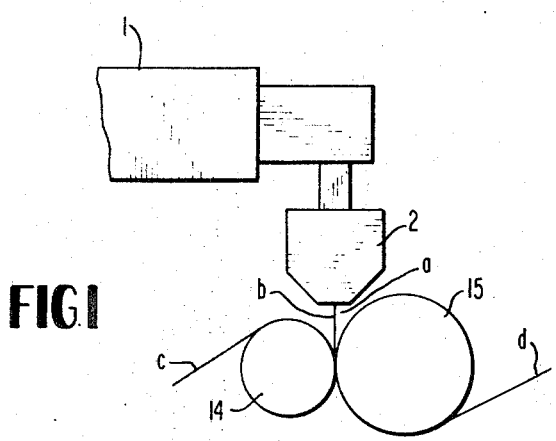
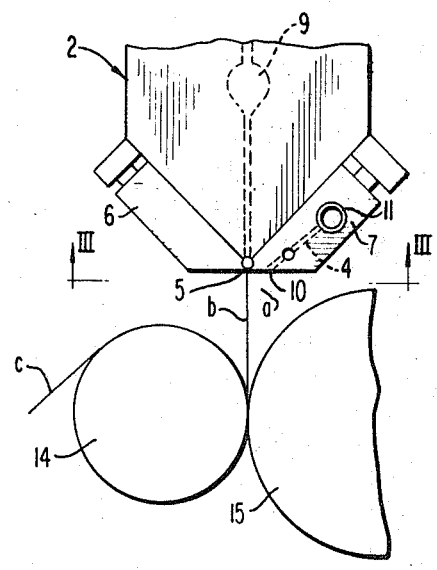
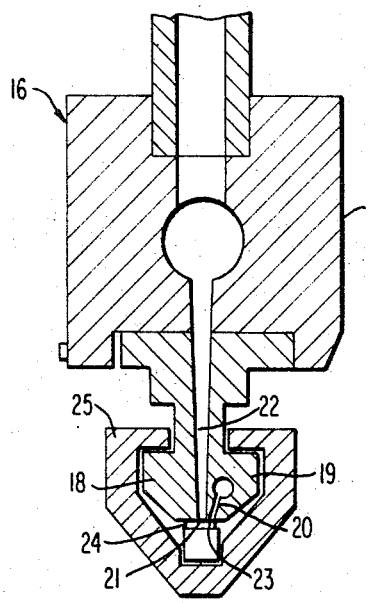
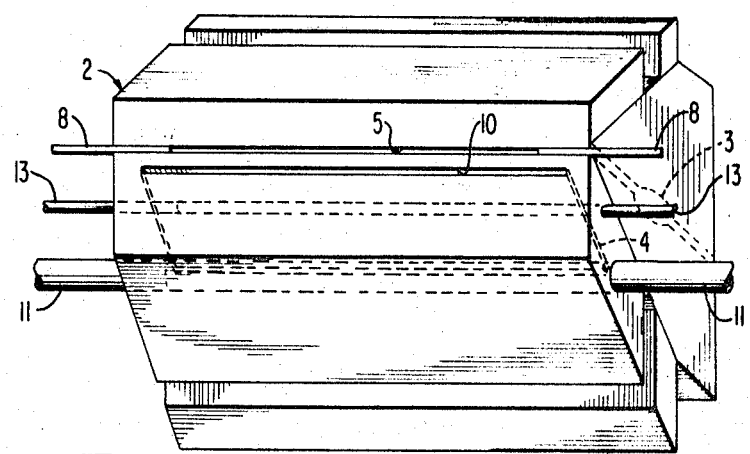
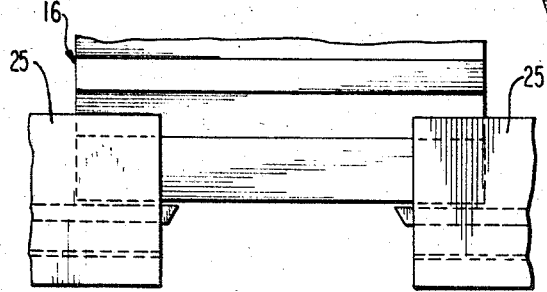

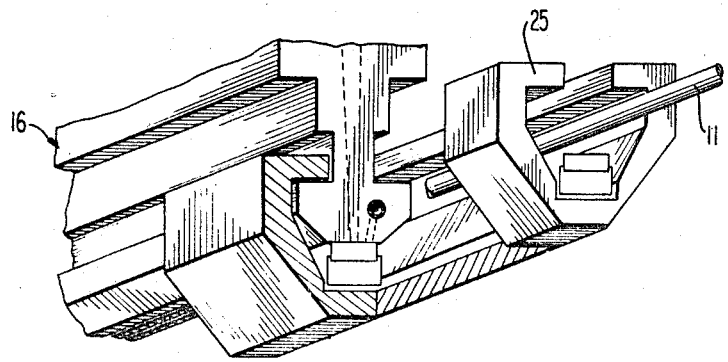
FIG.6
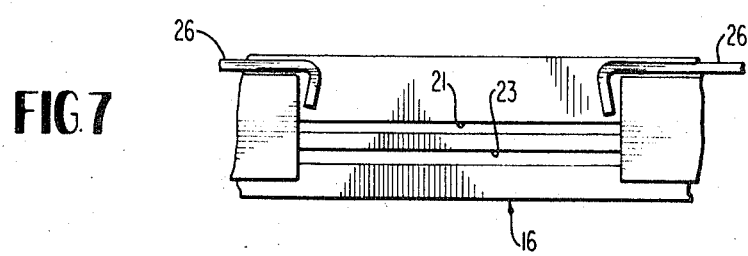
FIG.7
FIG.8
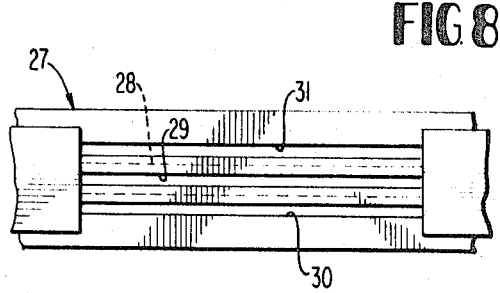
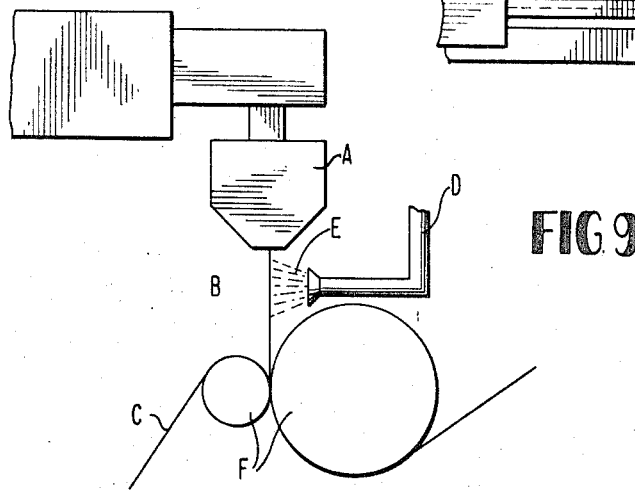
FIG.9
INVENTORS
RIKITA SAKATA
KOHEI MASUDA
TAKU UCHIGAKI
MASAKAZU ARAI

3,578,527
Patented May 11, 1971

3,578,527
METHOD OF PRODUCING A LAMINATED ARTICLE EMPLOYING EXTRUSION AND AN INERT GAS
Rikita Sakata, Kohei Masuda, Taku Uchigaki, and Masakazu Arai, Yokkaichi-shi, Japan, assignors to Mitsubishi Petrochemical Industry Co., Ltd., Tokyo, Japan
Filed Mar. 11, 1968, Ser. No. 712,113
Claims priority, application Japan, Mar. 10, 1967, 42/14,921
Int. Cl. B29c 23/00
U.S. Cl. 156—244                    17 Claims

ABSTRACT OF THE DISCLOSURE

A method for producing composite laminated articles by extruding a thin film of melted resin such as polyethylene, polypropylene, and the like, onto a base material such as paper, metallic foil and the ilke, the melted resin being extruded at its oxidizing temperature whereby the surface opposite to the surface to be bonded to the base material of the extruded film is covered by inert gas while the bonding surface is oxidized by the air such that the non-bonding surface is prevented from being oxidized by the air. By this method, a laminated composite article having superior adhering properties between the resin film and the base and having superior heat sealing properties, without offensive odors, is obtained.

Apparatus for carrying out the above-mentioned method wherein means providing an apparatus for issuing inert gas is provided adjacent to the mouth piece of the resin extruder.

BACKGROUND OF THE INVENTION

In general, composite laminated articles produced by extruding thin films of melted polyolefin resins such as polyethylene, polypropylene or the like, onto a base material, such as cellophane, paper, metallic foil, polyester film or the like, so as to laminate the melted thin resin film onto the base material, has superior moisture resisting properties and is suitable for use in packaging materials. However, when both surfaces of the melted thin resin film is allowed to contact the air so that both surfaces are free to be oxidized during the extruding step, the adhering property of both surfaces is improved. However, the surface of the resin film which is opposite to that bonded to the base material will tend to have inferior heat sealing properties and will produce an offensive odor in comparison with articles made of a single film produced at lower temperatures. This is clearly understood when an article made of a single polyethylene film extruded at lower temperature such as 280° C. is compared with a laminated composite article which is formed by extruding the melted thin polyethylene film from the mouth piece of the extruder at a temperature above about 290° C. so as to be bonded to the base material.

On the other hand, a laminated composite article which is formed by extruding the melted thin resin film onto a base material at non-oxidizing temperatures has superior heat sealing properties without offensive odors, but the adhering property of the resin film onto the base material is low. Therefore, when it is desired to produce a laminated composite article having superior adhering properties, the heat sealing properties of the article are deteriorate and an offensive odor is generated. When it is desired to produce a laminated composite article having superior heat sealing properties without offensive odors, the adhering property of the resin film is necessarily deteriorated.

As described above, there has been many difficulties in the prior art in producing a laminated composite article which has superior adhering properties as well as superior heat sealing properties without offensive odors. It has been necessary in the prior art to apply strict production controls in producing a laminated composite article having high quality, but it has been unavoidable in producing a large quantity of articles to provide articles of inferior quality.

There is disclosed in the prior art means for producing a laminated composite article wherein a jet nozzle for issuing inert gas is located at one side of the melted thin resin film extruded from the extruder mouth piece opposite to that to be bonded to the base material, so that inert gas, issuing from said nozzle is blown against the side of the melted resin film opposite to that to be bonded thereby preventing this surface from being oxidized. It has been impossible to make the distance between the mouth piece of the extruder and the press rolls suitable because the jet nozzle for issuing inert gas is located therebetween. Therefore, there is a tendency for incomplete bonding of the resin film with the base material resulting from the drop in temperature of the melted resin film before reaching the base material. Further, it is very difficult to cover the entire surface of the resin film with inert gas during the production of the laminated composite article, and a very large quantity of inert gas is required for processing. Further, stability in feeding the thin film of melted resin at a high speed is not achieved, thereby preventing the efficient production of laminated composite articles of high quality from being carried out.

The present invention avoids the above-mentioned disadvantages in the prior art.

SUMMARY OF THE INVENTION

The present invention aims at providing a novel and useful method for producing a laminated composite article in which the adhesion of the resin film with the base material and the heat sealing properties of the laminated composite article are very superior and which article does not have an offensive odor. It is further an object of the invention to provide an apparatus for carrying out the above-stated method.

The method of the present invention is achieved by producing laminated composite articles wherein preheated inert gas is issued from a jet aperture located in the mouth piece in juxtaposition to the extruding opening in the mouth piece. The jet aperture is situated in an obliquely downward direction with respect to the direction of feeding of the resin film over the entire width of said resin film thereby covering the non-bonding surface of the resin film with said inert gas while the melted resin film is directed to the press roller means together with the base material thereby laminating the base material with the resin film.

In order to carry out the above-mentioned method, an apparatus is provided in which an opening for discharging the melted resin and an opening for issuing inert gas located adjacent to said discharging opening is in parallel relationship in the mouth piece of the extruder, so that the preheated inert gas is issued against the non-bonding surface of the melted extruded resin film covering the entire width of the resin film in the obliquely downward direction thereby preventing the surface contacted with the inert gas from being oxidized while the surface of the resin film to be bonded to the base material is air oxidized.

The pressing rollers are located immediately beneath said extruder mouth piece so as to force the resin film and the base material passing therebetween in close contact with each other so that the resin film is bonded to the base material.

BRIEF DESCRIPTION OF THE DRAWING

FIG. 1 is a schematic general view illustrating the apparatus constructed in accordance with the present invention for producing the laminated composite article;

FIG. 2 is a detailed side view in enlarged scale showing the part of the apparatus shown in FIG. 1, in which an embodiment of the mouth piece for extruding the resin film forming the part of the laminated composite article is shown in detail;

FIG. 3 is a perspective view taken along line III—III in FIG. 2 illustrating the mouth piece for extruding the resin film;

FIG. 4 is a cross-sectional view showing modification of the mouth piece for extruding the resin film for use in carrying out the present invention;

FIG. 5 is a side view of the portion of the mouth piece shown in FIG. 4, said portion being provided with the slit for discharging the resin film;

FIG. 6 is a perspective view showing the mouth piece shown in FIG. 4;

FIG. 7 is a bottom view of the portion of the mouth piece shown in FIG. 4;

FIG. 8 is a bottom view showing the portion of a modification of the mouth piece shown in FIG. 4; and FIG. 9 is a schematic general view showing the prior art apparatus for producing a laminated composite article.

DETAILED DESCRIPTION OF THE PREFERRED EMBODIMENT

Referring to FIGS. 1 to 3, mouth piece 2 mounted on extruder 1 for extruding resin film is provided therein with the usual extruding slit 3 for extruding the melted resin film and jet slit 4 for issuing inert gas. The width of opening 5 of said extruding slit 3 is adjustable by shifting die lips 6 and 7 while the length of said opening 5 is adjustable by shifting adjusting rods 8. Extruding slit 3 extends vertically in mouth piece 2 from manifold 9 to the lower end of mouth piece 2.

Jet slit 4 for issuing inert gas is provided in one die lip 7 of die lips 6, 7 and located in the direction so that the extension of said slit 4 intersects obliquely the extension of said slit 3 at a position immediately beneath said mouth piece 2. Opening 10 of said jet slit 4 is located in parallel relationship to said opening 5 of said extruding slit 3. Cavity 12 communicating with jet slit 4 is provided in die lip 7 and conduits 11, 11 connected to either sides of die lip 7 communicate with said cavity 12 for introducing inert gas thereto, said cavity 12 in turn feeding inert gas to said opening 10 of said jet slit 4. Adjusting rods 13 are provided at either sides of said jet slit 4 for adjusting the width of the flattened jet of inert gas issuing from said opening 10.

The relationship between said extruding slit 3 and said jet slit 4 with respect to the location thereof is so selected that, when the melted resin film is extruded from said extruding slit 3 and inert gas is issued from said jet slit 4, the jet of the inert gas thus issued from said slit 4 intersects obliquely downwardly the extruded melted resin film at a position immediately beneath said opening 5 of said extruding slit 3 and that the jet of the inert gas issuing from said slit 4 extends over the entire width of the melted extruded resin film.

Press roller means consisting of press roller 14 and cooling roller 15 is provided immediately beneath said mouth piece 2 for extruding the resin film.

The apparatus thus constructed operates as follows: The melted resin material which is heated and the constituents of which are mixed sufficiently with each other is extruded downwardly through manifold 9 and extruding slit 3 provided in mouth piece 2 thereby feeding the resin in the form of thin film from said opening 5 of said slit 3, and at the same time, inert gas is introduced into cavity 12 through conduits 11, and is discharged through slit 4 from opening 10 with the size of jet of the inert gas being suitably adjusted by adjusting means so that the jet of the inert gas is blown against said melted extruded resin film $b$ in the obliquely downward direction over the entire width of resin film $b$. Meanwhile, base material $c$ is fed around press roller 14 so that base material $c$ and melted extruded resin film $b$ are nipped together between press roller 14 and cooling roller 15 thereby bonding said resin film $b$ to base material. After leaving press roller means, finished laminated composite article $d$ is obtained from resin film $b$ and base material $c$. The surface of extruded resin film $b$ against which inert gas $a$ is blown is prevented from being oxidized because the air is prevented from contacting with the surface by the jet of inert gas $a$. Since the temperature drop of resin film $b$ is low because the inert gas issuing from slit 4 provided in die lip 7 is preheated. Since the jet of inert gas $a$ is applied to resin film $b$ closely adjacent to opening 5 of extruding slit 3 from which resin film $b$ is extruded, melted resin film $b$ can be kept at sufficiently high temperature, and, at the same time, the inert gas is applied to the surface of the resin film well before the air contacts the surface of the resin film thereby positively preventing the resin film from being oxidized. Further, the quantity of inert gas required to carry out the above process can be made little. Since the jet of the inert gas is directed obliquely downwardly to the surface of the resin film which is fed downwardly, the stability in the feeding of the resin film at high speed is not deteriorated. The mechanism for preventing the non-bonding surface of the resin film from being oxidizing can be provided in the mouth piece itself thereby permitting the distance between the mouth piece and the press roller means to be made very short so that the significant effectiveness for obtaining laminated composite articles of high quality is achieved.

It is preferable to adjust the length of opening 10 of jet slit 4 for issuing inert gas by means of adjusting rods 13 so that the length of said opening 10 is made a little shorter than that of opening 5 of extruding slit 3 thereby insuring that the inert gas when it is issued from opening 10 is prevented from flowing in the region of the surface of the melted resin film which is to be bonded to the base material.

FIGS. 4 to 8 illustrate a modification of the mouth piece in accordance with the present invention in which means is provided for preventing the inert gas issuing from the jet slit from flowing into the region of the surface of the resin film.

In FIGS. 4 to 7, mouth piece 16 provided with socalled external deckel is shown. Mouth piece 16 comprises main body 17, die lip 18 of conventional type, die lip 19 which is analogous to die lip 7 shown in FIG. 2 and is provided with jet slit 20 for issuing inert gas, deckel rods 24, deckel holders 25 as shown in FIG. 4. Slit 22 is defined between die lips 18 and 19, said slit 22 terminating at opening 21. Slit 20 terminates at opening 23. Deckel rods 24 serve to simultaneously adjust the length of each of opening 21 of extruding slit 22 and opening 23 of jet slit 20. Deckel holders 25 are provided with tubes 26 for supplying air, respectively, as shown in FIG. 7. The air issuing from said tubes 26 serve to prevent the inert gas from flowing in the region of the surface of the resin film to be bonded to the base material. In this embodiment, the mechanism for producing the laminated composite article is similar to that as shown in FIGS. 1 to 3.

A further modification of the embodiment shown in FIGS. 4 to 7 is illustrated in FIG. 8. In this embodiment, the mouth piece 27 is provided with extruding slit 28 having opening 29 at its extremity for extruding the melted resin film jet slit having opening 30 at its extremity for issuing inert gas located at one side of opening 29 and spaced a small distance from said opening 29 in parallel relationship thereto, and a slit having opening 31 for issuing air located at one side of opening 29 and spaced a small distance from said opening 29 in parallel relationship thereto, and a slit having opening 31 for issuing air located at the other side of opening 29 and spaced a small distance from said opening 29 in parallel relationship thereto. The air issuing from opening 31 serves to prevent the inert gas issuing from opening 30 from flowing around the edges of the extruded resin film into the region of the surface of the resin film to be bonded to the base material.

Example 1

By using the apparatus in accordance with the present invention in combination with extrusion laminator produced and sold by Egan Company having 65 mm. D extruler, polyethylene YUKALON LK-30 (registered trademark) produced in high pressure process by Mitsubishi Yuka Kabushiki Kaisha and sold by said company (said polyethylene having specific weight of 0.918, melt index of 4) was laminated onto the base material made of cellophane "PT" produced and sold by Futamura Kagaku Co. to which n-hexane solution containing 3% by weight of anchor coating agent "TPST-31" of organic titanate produced by Nippon Soda Co. was applied and thereafter dried. Nitrogen gas under high pressure filled in a bomb and available in the market being utilized as the inert gas to be used in the present invention. The diameter of the conduits connected to the die lip for introducing nitrogen gas was 5 mm. $\phi$ and the width of the opening of the slit for issuing nitrogen gas was 2 mm., and the length of the opening was 700 mm. The rate of flow of nitrogen gas was set to be 30 l./min.

Under the above conditions, laminated composite articles consisting of cellophane laminated thereon with polyethylene film and having the thickness of coating of 60 micron were produced at various temperatures.

The adhering strength of the polyethylene film with the cellophane, heating sealing property, and degree of offensive odor of the thus produced articles were tested in accordance with the methods defined in JIS Z 1526. The results of the tests are as follows.

I. In the case the mouth piece as shown in FIGS. 2 and 3 was used.

TABLE 1

| Item | Processing temp., °C. | Adhering strength, g./2 cm. | Heat sealing strength, kg./2 cm. | | Odor |
|---|---|---|---|---|---|
| | | | Immediately after processing | After one month kept at 40° C., 80% RH | |
| Prior art in which the surface of resin film was not prevented from being oxidized. | 310 | 710 | 3.7 | 1.8 | Little. |
| | 330 | 730 | 2.8 | 0.2 | Strong. |
| The mouthpiece of the present invention as shown in FIGS. 2 and 3 was used. | 310 | 720 | 5.1 | 4.2 | Very little. |
| | 330 | 730 | 3.9 | 2.1 | Little. |

II. In case the mouth piece as shown in FIGS. 4 to 7 was used.

TABLE 2

| Item | Processing temp., °C. | Adhering strength, g./2 cm. | Heat sealing strength, kg./2 cm. | | Odor |
|---|---|---|---|---|---|
| | | | Immediately after processing | After one month kept at 40° C., 80% RH | |
| Prior art in which the surface of resin film was not prevented from being oxidized. | 310 | 700 | 3.5 | 1.7 | Little. |
| | 330 | 710 | 2.6 | 0.1 | Strong. |
| The mouthpiece of the present invention as shown in FIGS. 4 to 7 was used. | 310 | 710 | 5.2 | 4.4 | Very little. |
| | 330 | 720 | 4.0 | 2.3 | Little. |

Further, the comparison of the test results obtained by the articles of the present invention with those obtained by the articles made, in accordance with the prior art in which the oxidization preventing means was applied to the surface of the resin film which was opposite to the surface to be bonded to the base material, is shown in Table 3. In this case, the test conditions were the same as those of the above-mentioned cases I and II except that the distance between the mouth piece and the press roller means was set to 110 mm. and the effective length of the opening of the mouth piece was set to 600 mm. and the thickness of coating was 60 micron, and the take up speed was set to 27 m./min., while the length of the slit for issuing inert gas in the prior art was 550 mm. and the width of the slit was 2 mm. so that the jet of inert gas formed in the air knife shape and the slit was located at the position 30 mm. beneath the mouth, the flow rate of nitrogen gas being 30 l./min. The slit of the die lip of the present invention was 500 mm. in length, 2 mm. in width and the flow rate of nitrogen gas was 30 l./min.

TABLE 3

| Item | Processing rosin temp., °C. | Adhering strength, g./2cm. | Heat sealing strength, kg./2cm. | | Odor |
|---|---|---|---|---|---|
| | | | Immediately after processing | After one month kept at 40° C., 80% R.H. | |
| Prior art in which oxidization preventing means was applied to the surface of resin film. | 310 | 460 | 4.2 | 2.1 | Little. |
| The mouthpiece of the present invention as shown in Figs. 4 to 7 was used. | 330 | 520 | 3.4 | 1.2 | Fairly little. |
| | 310 | 570 | 5.2 | 4.4 | Very little. |
| | 330 | 650 | 4.0 | 2.3 | Little. |

The conditions for heat sealing were selected to be the temperature of 120° C., pressure of 1 kg./cm.² for one second.

FIG. 9 shows the prior art in which the oxidation preventing means is provided for preventing the surface of the resin film from being oxidized. In contrast to the present invention, the jet tube for issuing inert gas must be located between the mouth piece and the press roller means in the prior art as shown in FIG. 9.

Therefore, it is impossible in the prior art to shorten the distance between the mouth piece and the press roller means. In the present invention, however, the distance between the mouth piece and the press roller means can be made short just the same as in the case of conventional type of extrusion laminator apparatus in which no oxidation preventing means is provided, or the distance can be made further shorter. Since the inert gas is issued through the die lip in the preheated state by the heat of the die lip which is heated by the mouth piece which is in turn heated by the extrusion of the resin film, the temperature drop of the resin film is very little in comparison with the prior art thereby dispensing with additional heating means. Further, since the oxidation of the resin film is prevented by virtue of the shorter distance between the mouth piece and the press roller means in addition to the action of the jet of inert gas, the quantity of the inert gas required is small. Since the jet of inert gas of relatively little flow rate is applied to the surface of the resin film in the obliquely downward direction with respect to the vertically downward direction of feeding of the resin film, the stability of the feeding of the resin film at high speed is insured.

As described above, the present invention has significant effectiveness in producing laminated composite articles of high quality as shown in Tables 1 to 3 by issuing inert gas preheated by the heat of the mouth piece against the surface of the melted resin film extruded from the mouth piece of the extruder which surface is opposite to that to be bonded to the base material in the obliquely downward direction with respect to the vertically downward direction of the feeding of the resin film thereby insuring the stability of feeding of the resin film and preventing the air from contacting the surface of the resin film so as to avoid the oxidation of the surface of the resin film without causing the temperature drop of the resin film which deteriorates the adhering strength of the resin film with the base material and, at the same time, avoiding the offensive odor.

What is claimed is:

1. A method for providing laminated composites which comprises:

extruding a melted resin film having at least two surfaces and at least one edge between said surfaces at a temperature of at least the oxidizing temperature of the resin of said melted resin film through a mouth piece of a hot resin extruder, passing an inert gas through means having an aperture for issuing an inert gas at high velocities which is positioned within said mouth piece in juxtaposition with the extruding opening of said mouth piece such that the inert gas impinges against one surface of said extruded melted resin film thereby preventing oxidation of said resin at said surface, and contacting under pressure the surface of said melted resin film not impinged with said inert gas with a suitable base material for providing laminated composites so as to form said laminated composites.

2. The method of claim 1 wherein said extruded resin film is contacted under pressure with said base material by means of a press roller.

3. The method of claim 1 wherein said inert gas is passed in an obliquely downward direction against the surface of said resin film.

4. The method of claim 1 wherein air is directed against at least one of the edges of said resin film while said inert gas is directed against one of said surfaces so that said surfaces contacted with said inert gas are protected from oxidation.

5. The method of claim 1 wherein said resin is a polyolefin resin.

6. The method of claim 5 wherein said resin is polyethylene.

7. The method of claim 1 wherein said melted resin film is extruded in a substantially vertically oriented downward direction.

8. The method of claim 1 wherein air is directed against the surface of said melted resin film which is not impinged with said inert gas.

9. The method of claim 8 wherein said inert gas is directed against substantially the entire area of said one surface.

10. The method of claim 8 wherein said inert gas is pre-heated prior to being impinged against said one surface of said extruded melted resin film.

11. The method of claim 2 wherein said extruded resin film after being contacted under pressure with said base material is cooled.

12. The method of claim 1 wherein said suitable base material is selected from the group consisting of base material suitable for providing laminated composites selected from the group consisting of synthetic resins, paper, metallic base materials and natural resins.

13. The method of claim 12 wherein said base material is a synthetic resin.

14. The method of claim 12 wherein said base material is paper.

15. The method of claim 12 wherein said base material is a metallic foil.

16. The method of claim 12 wherein said base material is a natural resin.

17. The method of claim 16 wherein natural resin is cellophane.

References Cited

UNITED STATES PATENTS

| | | | |
|---|---|---|---|
| 3,310,447 | 3/1967 | Matthews | 156—244 |
| 3,314,840 | 4/1967 | Lloyd et al. | 156—244UX |
| 3,361,607 | 1/1968 | Bruno | 156—244X |

BENJAMIN R. PADGETT, Primary Examiner

S. J. LECHERT, Jr., Assistant Examiner

U.S. Cl. X.R.

156—281, 306, 497; 264—176; 34—22